United States Patent
Salem et al.

(10) Patent No.: US 9,954,865 B2
(45) Date of Patent: Apr. 24, 2018

(54) SENSORS FOR A RESOURCE

(71) Applicant: Accenture Global Services Limited, Dublin (IE)

(72) Inventors: Malek Ben Salem, Alexandria, VA (US); Rafae Bhatti, Sunnyvale, CA (US); James Solderitsch, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 238 days.

(21) Appl. No.: 14/846,108

(22) Filed: Sep. 4, 2015

(65) Prior Publication Data

US 2015/0381631 A1    Dec. 31, 2015

Related U.S. Application Data (63) Continuation-in-part of application No. 13/774,356, filed on Feb. 22, 2013, now abandoned.

(60) Provisional application No. 61/602,427, filed on Feb. 23, 2012.

(51) Int. Cl.
*H04L 29/06* (2006.01)
*G06F 21/62* (2013.01)
*G06F 21/44* (2013.01)

(52) U.S. Cl.
CPC ............ *H04L 63/102* (2013.01); *G06F 21/44* (2013.01); *G06F 21/6218* (2013.01); *H04L 63/0853* (2013.01)

(58) Field of Classification Search
CPC ... H04L 63/102; H04L 63/0853; G06F 21/44; G06F 21/6218
See application file for complete search history.

(56) References Cited

U.S. PATENT DOCUMENTS

| | | |
|---|---|---|
| 5,048,085 A | 9/1991 | Abraham et al. |
| 5,907,836 A * | 5/1999 | Sumita ................ G06F 17/3061 |
| | | 707/754 |
| 6,647,384 B2 | 11/2003 | Gilmour |
| 6,892,201 B2 | 5/2005 | Brown et al. |
| 6,931,402 B1 | 8/2005 | Pereira, III |
| 6,978,381 B1 | 12/2005 | Te et al. |

(Continued)

OTHER PUBLICATIONS

Zhi-qiang, Research and Design Concepts on the Trust Scoring System of Electronic Commerce, Third Pacific-Asia Conference on Circuits, Communication and System (PACCS), Publication date 2011, 3 pages, http://ieeexplore.ieee.org/stamp /stamp.jsp?tp= &arnumber=5990195.

(Continued)

*Primary Examiner* — Hosuk Song
*Assistant Examiner* — J. Brant Murphy
(74) *Attorney, Agent, or Firm* — Harrity & Harrity, LLP (57) ABSTRACT

A system may include first sensor to monitor first information relating a volume of information searched by a user, a second sensor to monitor second information relating to a number of requests, made by the user, to access a resource, a third sensor to monitor third information relating to a number of requests, made by the user, from different geographic locations, and a device to receive the first information, the second information, and the third information, and process the first information, the second information, and the third information in connection with the resource.

20 Claims, 4 Drawing Sheets

(56) References Cited

U.S. PATENT DOCUMENTS

| | | | |
|---|---|---|---|
| 7,162,487 B2 | 1/2007 | Kindo et al. | |
| 7,467,414 B2 | 12/2008 | Schlesinger | |
| 7,574,745 B2 | 8/2009 | Yoneyama | |
| 7,630,986 B1 | 12/2009 | Herz et al. | |
| 8,434,128 B2 | 4/2013 | Kennedy | |
| 8,463,789 B1* | 6/2013 | Joshi | G06F 17/30011 707/738 |
| 8,463,790 B1* | 6/2013 | Joshi | G06F 17/30011 707/738 |
| 8,478,708 B1* | 7/2013 | Larcom | G06Q 10/06 706/52 |
| 8,607,325 B2 | 12/2013 | Kennedy | |
| 2003/0063113 A1* | 4/2003 | Andrae | G06F 17/2795 715/700 |
| 2005/0193221 A1* | 9/2005 | Yoneyama | G06F 21/6218 726/5 |
| 2007/0220614 A1 | 9/2007 | Ellis et al. | |
| 2008/0307498 A1 | 12/2008 | Johnson et al. | |
| 2010/0146607 A1 | 6/2010 | Piepenbrink et al. | |
| 2011/0209196 A1* | 8/2011 | Kennedy | G06F 21/55 726/1 |
| 2012/0185910 A1* | 7/2012 | Miettinen | G06F 21/31 726/1 |
| 2012/0272330 A1* | 10/2012 | Soghoian | H04L 51/14 726/26 |
| 2013/0227712 A1* | 8/2013 | Salem | G06F 21/6218 726/30 |
| 2013/0232543 A1* | 9/2013 | Cheng | G06F 21/6218 726/1 |
| 2013/0239168 A1* | 9/2013 | Sreenivas | G06F 21/57 726/1 |
| 2013/0239177 A1* | 9/2013 | Sigurdson | H04L 63/102 726/4 |
| 2013/0325884 A1* | 12/2013 | Soel | G06F 17/2211 707/758 |
| 2016/0307223 A1* | 10/2016 | Garcia Gomez | G06Q 30/0201 |

OTHER PUBLICATIONS

Yazid, et al., Enhancement of Asset Value Classification for Mobile Devices, 2012 International Conference on Cyber Security, Cyber Welfare and Digital Forensic (CyberSec), publication date 2012, pp. 106-110, http://ieeexplore.ieee.org/stamp/stamp.jsp?tp=&arnumber=6246097.

Bhatti et al., "A Trust-Based Context-Aware Control Model for Web-Services," Distributed and Parallel Databases, 2005, pp. 83-105, 18, Springer Science+ Business Media, Inc., Netherlands.

CA RiskMinder™, CA Technologies Data Sheet, 2012, pp. 1-2, www.ca.com/riskminder, USA.

Cheng et al., "Fuzzy Multi-Level Security: An Experiment on Quantified Risk-Adaptive Access Control," Security and Privacy, IEEE Symposium, 2007, pp. 222-230, Spring, 07, IEEE Computer Society, USA.

Depasquale et al., "Applied Research for Computing Enterprise Services Model Technical Results," Technical Report DI-MISC-80508A, 2007, 57 pages, USA.

Kagal et al., Trust-Based Security in Pervasive Computing Environments, Computer, Dec. 2001, pp. 154-159, 34, USA.

Kuhn et al., "Adding Attributes to Role-Based Access Control," IEEE Computer, 2010, pp. 79-81, USA.

Ni, et al., "Risk-based Access Control Systems Built on Fuzzy Inferences," Proceedings of the 5th ACM Symposium on Information, 2010, pp. 250-260, ACM, USA.

Oracle, An Oracle Adaptive Access Manager, 2008, pp. 3-23, Oracle, USA.

Ryutov et al., "Adaptive Trust Negotiation and Access Control," SACMAT'05, 2005, pp. 1-8, ACM, Sweden.

Ryutov et al., "Generic Authorization and Access-Control," API, 2002, 2 pages.

Salem et al., "Modeling user Search-Behavior for Masquerade Detection," Proceedings of the 14th International Symposium on Recent Advances in Intrusion Detection, 2011, 20 pages, Springer, USA.

Wang et al., "Quantified Risk-Adaptive Access Control for Patient Privacy Protection in Health Information Systems," ASIACCS'11, 2011, pp. 406-410, ACM, China.

* cited by examiner

SENSORS FOR A RESOURCE

RELATED APPLICATIONS

This application is a continuation-in-part of U.S. patent application Ser. No. 13/774,356, filed Feb. 22, 2013, which claims priority under 35 U.S.C. § 119 to U.S. Provisional Patent Application No. 61/602,427, filed on Feb. 23, 2012, the disclosures of which are incorporated by reference herein in their entireties.

TECHNICAL FIELD

The present disclosure relates to a system and method for access control and, more particularly, to a system and method for adaptively controlling requests to access resources based on the risk associated with the request.

BACKGROUND

Organizations endeavor to protect their sensitive information from unauthorized access or use. Given the increased use of computer systems as a communication, delivery, and storage medium, organizations are constantly struggling to protect sensitive information related to those transactions. For example, banking organizations endeavor to prevent data breaches that could destabilize financial assets, ranging from mere merchant transactions to stock-market trading. Government entities likewise struggle to protect the unauthorized access of classified information systems, including tactical military records, social security databases, medical health reports, etc.

In some instances, departments within an organization may desire to limit or expand access rights to a sub-group of employees within that department. For example, a hospital may approve or deny different levels of access to a medical database based on the requestor's role as a nurse, accountant, or executive. On the other hand, the hospital may grant all access requests to that same database from requestors identified as physicians, regardless of their departmental affiliation.

Some organizations may require dynamic resource management. Specifically, in response to evolving business conditions or catastrophic acts of nature, these organizations must automatically reconfigure an employee's access privileges. Examples include permanently increasing a recently-promoted employee's access privileges or automatically increasing access privileges to all hospital employees during national emergencies. Alternatively, organizations may seek to automatically decrease employee access to particular resources based on inter-department transfers, employee resignation, or natural attrition.

Administering such dynamic and multi-tiered access control systems while fostering knowledge exchange among multiple branches of an organization requires tremendous efforts. Numerous variables must be considered, including the organization's risk tolerance, core business objectives, system stability, and employee roles and classifications. Indeed, many organizations fail to implement adequate access controls and instead provide their employees with unrestricted access to sensitive information based merely on their status as an employee of the organization. Such measures leave these organizations vulnerable to data breaches; particularly, the unauthorized access of sensitive data.

Conflicting organizational objectives compound the complexity of dynamic and multi-tiered access control systems. For example, organizations generally seek to promote collaborative efforts between departments, yet employ static access controls by restricting employee access to department-specific resources. This captures the classic organizational dilemma: fluid exchange of valuable information between departments versus the risks of its misuse. These considerations, among others, contribute to the difficulty in managing user access to resources and other information assets.

Traditional access control mechanisms lack the flexibility required to make adequate access control decisions that promptly respond to a changing organizational environment. Current access control decisions often adopt a static all-or-nothing approach, where an individual either has or lacks the privilege to access a resource. In addition, privilege revisions, if ever performed, may occur only sporadically, thereby exposing the organization to unnecessary risks. For example, employees of an organization may remain privileged to access sensitive information long after their departure or termination from that organization. Indeed, disgruntled employees frequently explore this vulnerability to access and expose embarrassing or confidential information. It is thus desirable to have a system for dynamically managing access to organizational resources, and to automatically modify access privileges within an organization's risk tolerance, based on a dynamic calculation of risk associated with each request to access resources.

SUMMARY

In accordance with the present disclosure, as embodied and broadly described herein, a method for management of resources comprises accessing profiles of users, computing first trust scores for the users, receiving an access request from one of the users for access to a resource, and accessing a sensitivity score of the resource. The method further comprises computing a confidence score for the requesting user, computing a need-to-access score for the requesting user, computing a second trust score for the requesting user, and selectively granting the requesting user access to the requested resource, based on the second trust score.

In accordance with the present disclosure, as embodied and broadly described herein, a computer-readable recording medium stores a computer-executable program. The program, when executed by a processor, performs a method for management of resources that comprises accessing profiles of users, computing first trust scores for the users, receiving an access request from one of the users for access a resource, and accessing a sensitivity score of the resource. The method further comprises computing a confidence score for the requesting user, computing a need-to-access score for the requesting user, computing a second trust score for the requesting user, and selectively granting the requesting user access to the requested resource, based on the second trust score.

In accordance with the present disclosure, as embodied and broadly described herein, a system for management of resources is provided. The system comprises a memory to store data and instructions and a processor configured to access the memory and execute the instructions to access profiles of users, compute first trust scores for the users, receive an access request from one of the users for access to a resource, and access a sensitivity score of the resource. The processor is further configured to execute the instructions to compute a confidence score for the requesting user, compute a need-to-access score for the requesting user, compute a second trust score for the requesting user, and selectively grant the requesting user access to the requested resource, based on the second trust score.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering, or adding steps to the disclosed methods, except where noted. Accordingly, the following detailed description does not limit the disclosure. Instead, the proper scope of the disclosure is defined by the appended claims.

Systems and methods consistent with the present disclosure may offer the flexibility required to make real-time access control decisions that respond promptly to changing organizational environments, thus reducing risks of the unauthorized use or access of resources. Further, certain embodiments may grant or deny a user's request to access a resource based on certain risk factors including, for example, the user's trust level, the sensitivity of the information resource requested, and the overall system status. For example, when an employee of an organization attempts to access a document stored on the organization's server, the access control engine may grant or deny access to that document based on employee's trust level and the sensitivity of the document.

In this manner, systems consistent with the present disclosure may use the access control engine to dynamically control which users or services are authorized to access certain resources or information assets.

Figure 1:
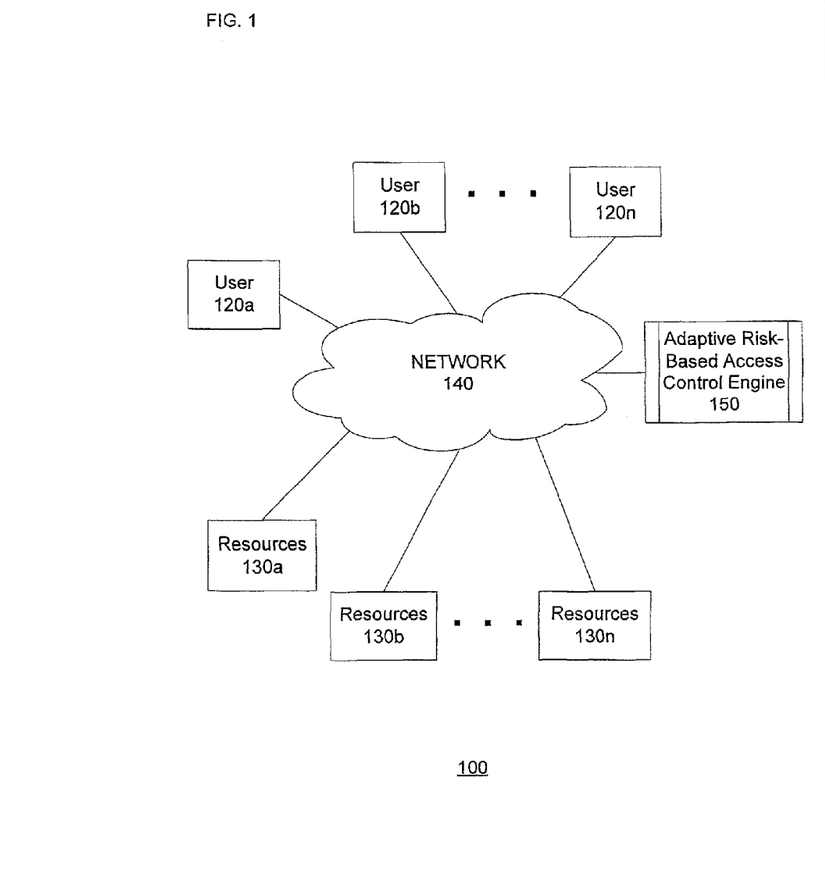
FIG. 1 illustrates an exemplary computing system for adaptive risk-based access controls, consistent with certain disclosed embodiments.

By way of a non-limiting example, FIG. 1 illustrates a system 100 in which the features and principles of the present disclosure may be implemented. System 100 is not limited to the number of components shown. Other variations in the number and/or arrangements of components of FIG. 1 may be implemented through hardware, software, firmware, etc. System 100 may include user 120 (e.g., user 120a, user 120b, through user 120n), an adaptive risk-based access control engine 150, resources 130 (e.g., resource 130a, resource 130b, through resource 130n) and a network 140.

As used herein, the term "user" is not limited to an individual human user, but includes all types of users which may seek access to resources 130, including organizations, entities, automated users such as software elements, etc. In some embodiments, users 120 may each include one or more devices operated by human users to access software applications and/or services, through an interface to network 140. For example, users 120 may be implemented using various devices capable of accessing a data network, such as, for example, a general-purpose computer or personal computer equipped with a modem or other network interface. Users 120 may also be implemented in other devices, such as, for example, laptop computers, desktop computers, mobile phones (with data access functions), Personal Digital Assistants ("PDA") with a network connection, IP telephony phones, or generally any device capable of communicating over a data network 140. In other embodiments, users 120 may include software elements connected to network 140 using, for example, application programming interfaces (APIs) through which resources 130 may present their capabilities and content.

In some embodiments, users 120 may be configured to transmit and/or receive data to/from access control engine 150. Data may be entered into and/or stored on one or more users 120. The data may include access requests to access control engine 150 to access resources 130. Access control engine 150 may grant or deny the request, based on calculated risks associated with that request.

Resources 130 may include one or more information assets corresponding to various types of information, including databases, documents, media files, records, financial data (e.g., credit bureau information, banking information, credit union information, lender information, etc.), publically-available resources (e.g., GOOGLE™, etc.), commercial resources (e.g., LEXIS NEXIS™, etc.), Application Programming Interfaces, etc. In some embodiments, resources 130 may include files and documents created by employees or owned by an organization that may be stored on a network. For example, resources 130 could include the organization's confidential information, such as patent applications, research article drafts, financial statements, trade secrets, employee data (e.g., employee name, social security number, address, roles, departmental affiliation, income, distributions to employees and/or government agencies, etc.), customer or client lists, etc. In some embodiments, resources 130 may include calculations previously made by access control engine 150 (i.e., historical data). In some embodiments resources 130 may include one or more systems, which enable creation, modification, and storage or other resources (e.g., database management systems, word processing software, business software, etc.).

Access control engine 150 may provide a platform for dynamically controlling access by users 120 to resources 130 or data stored within the resources. Access control engine 150 may be implemented using hardware, software, firmware, or combinations thereof and may be operable to receive and store data from various users 120. In some embodiments, access control engine 150 may receive requests from users 120 to access one or more resources 130. In addition, access control engine 150 may also grant or deny those requests based on, for example, the risk associated with that request.

In some embodiments, the functionality of access control engine 150 may be implemented on a single computer or server. In alternative embodiments, the functionality of access control engine 150 may be distributed amongst multiple computing devices without departing from the scope of this disclosure. Additionally, in some embodiments, access control engine 150 may be operated and/or implemented entirely within an organization's network 140 (e.g., a private company). In other embodiments, access control engine 150 may be operated and/or implemented in whole or in part by a third party vendor in support of the organization.

Network 140 provides communication between or among the various entities depicted in system 100. Network 140 may be a shared, public, or private network and may encompass a wide area network (WAN), local area network (LAN), an intranet, and/or the Internet. Network 140 may be implemented through any suitable combination of wired and/or wireless communication networks (including Wi-Fi networks, GSM/GPRS networks, TDMA networks, CDMA networks, Bluetooth networks, or any other wireless networks. Further, the entities of system 100 may be connected to multiple networks 140, such as, for example, to a wireless carrier network, a private data network, and the public Internet.

Figure 2:
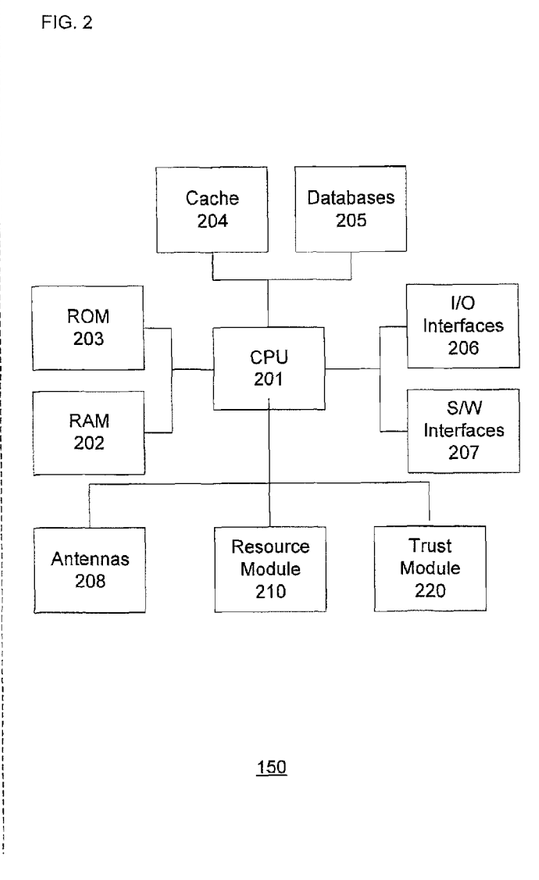
FIG. 2 is a block diagram of an exemplary adaptive risk-based access control engine, consistent with certain disclosed embodiments.

FIG. 2 is a block diagram of access control engine 150, consistent with certain disclosed embodiments. As discussed above, access control engine 150 may be operated and/or implemented by a private organization and/or a third party to grant or deny requests from users 120 to access resources 130. As shown in FIG. 2, access control engine 150 may include a central processing unit (CPU) 201 (also referred to herein as a processor) configured to execute computer program instructions to perform processes consistent with the disclosed exemplary embodiments. In addition, access control engine 150 may include random access memory (RAM) 202 and read-only memory (ROM) 203 configured to access and store information and computer program instructions, and a cache 204 to store data and information. In some embodiments, access control engine 150 may include one or more databases 205 to store tables, lists, or other data structures; I/O interfaces 206 (including, for example, interfaces to network 140); one or more displays (not shown); one or more printers (not shown); one or more keyboards (not shown), etc.); and software stored in RAM 202, ROM 203, and/or cache 204. In addition, access control engine 150 may include S/W interfaces 207; antennas 208 for wireless transmission and/or reception of data and/or other information; a resource module 210 configured to classify and assign sensitivity scores to resources 130; and a trust module 220 configured to compute trust scores for users 120.

Figure 3:
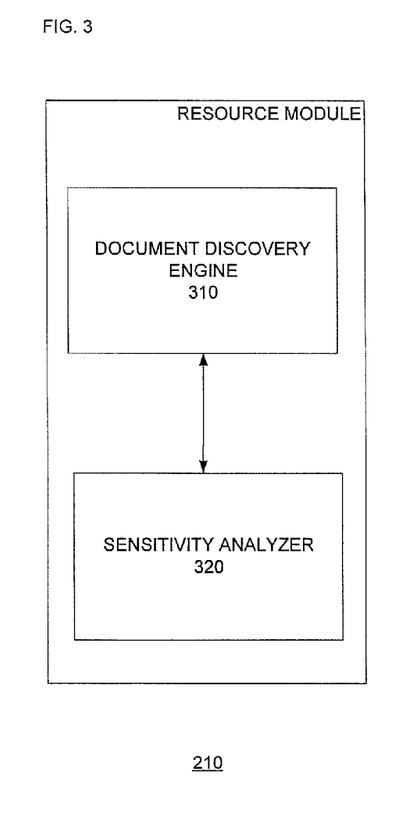
FIG. 3 is a block diagram of an exemplary resource module, consistent with certain disclosed embodiments.

FIG. 3 is a block diagram of resource module 210, consistent with certain embodiments. Resource module 210 may be, for example, a software component of access control engine 150 or a separate external hardware device configured to determine the sensitivity and confidentiality of resources 130 and to assign sensitivity scores to the resources 130. Resource module 210 may include a document discovery engine 310 and a sensitivity analyzer 320. Access control engine 150 may use sensitivity scores, associated with resources 130 and calculated by sensitivity analyzer 320, to determine whether to grant access to resources 130, in response to requests from users 120.

Figure 4:
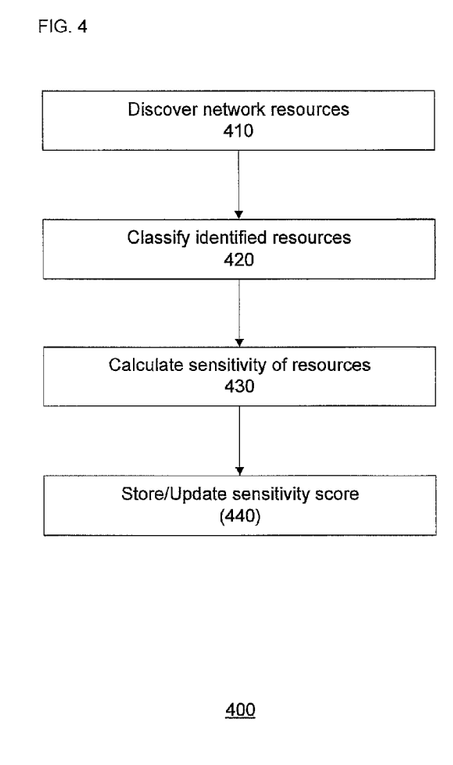
FIG. 4 is a flow chart of functions of an exemplary resource module, consistent with certain disclosed embodiments.

FIG. 4 is a flow chart of functions of an exemplary resource module 210, consistent with certain disclosed embodiments. As shown, document discovery engine 310 (FIG. 3) may initially discover resources 130 within network 140 (410). Sensitivity analyzer 320 may classify discovered resources 130 and calculate sensitivity scores for the discovered resources 130 (420/430). Resource module 210 may store and update sensitivity scores associated with resources 130 (440). In this manner, access control engine 150 may use sensitivity scores associated with the resources 130 to determine whether to grant requests from users 120 to access resources 130. In some embodiments, sensitivity analyzer 320 may classify resources 130 based on identified categories within an organization's network, for example, network 140. The resource classification process may further involve identifying categories of resources relevant to the organization, dividing these categories into ordered groups, conducting an inventory of resources on a network, and then allocating the inventoried resources to one or more of these groups or categories.

Sensitivity analyzer 320 may compute sensitivity scores of resources 130 based on several algorithms. In one embodiment, certain types of resources 130, such as documents, could be assigned model or static sensitivity scores. To assign sensitivity scores to such resources identified by document discovery engine 310, sensitivity analyzer 320, may, for example, extract the frequencies of the key words within identified resources 130. In this manner, higher sensitivity scores may be assigned to, for example, a patent document based on frequent occurrences of the word "claim." In another embodiment, an external device or system may perform functions of sensitivity analyzer 320. For example, a medical records system may assign sensitivity scores to resources associated with the medical records system. In turn, sensitivity analyzer 320 may assign these same sensitivity scores to similar resources identified by document discovery engine 310. Consequently, sensitivity analyzer 320 may use the sensitivity scores assigned by the medical records system without having to calculate an alternative score.

Figure 5:
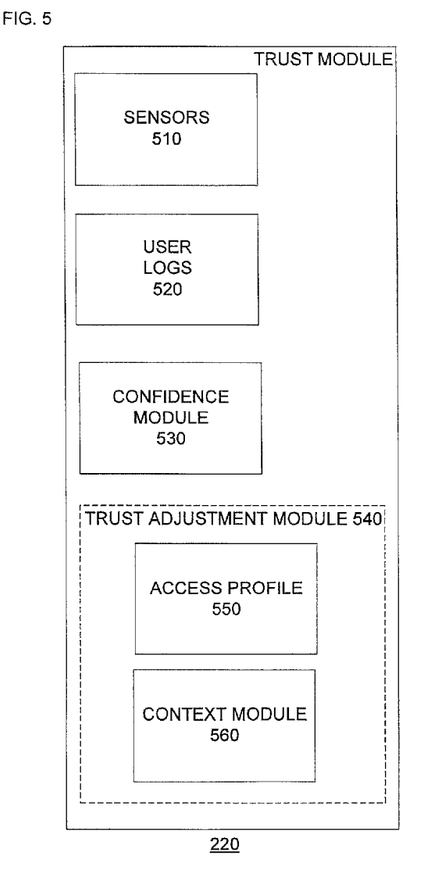
FIG. 5 is a block diagram of an exemplary trust module, consistent with certain disclosed embodiments.

FIG. 5 is a block diagram of an exemplary trust module 220, consistent with certain disclosed embodiments. Trust module 220 may be configured to establish the trust scores associated with requests of users 120 to access resources 130. Trust module 220 may include sensors 510, user logs 520, a confidence module 530, and a trust adjustment module 540. Sensors 510 may be distributed throughout network 140 to detect fraudulent or irregular activity of users 120. Sensors 510 may be individual computers or software modules coupled to network 140. In one embodiment, one or more sensors 510 may be configured to detect suspicious or fraudulent activity of users 120. For example, simultaneous access requests of the same user, coming from different geographic locations, may indicate suspicious activity. In another embodiment one or more sensors 510 may be configured to monitor the volume of information searched or the number of access requests made by a user compared to the prior historical levels stored in user logs 520.

Trust module 220 may use scores created by confidence module 530 in the calculation of user trust scores. Confidence module 530 may be configured to calculate identity confidence scores associated with requests of users 120 to access resource 130. In one embodiment, confidence module 530 may determine user identity scores (CS(r)) based on the conformity of recent behavior of users 120 (within the current user session) with user historical behavior recorded in user logs 520. For example, confidence module 530 may designate a user as "deviant" if the user's current behavior is inconsistent with its prior historical behavior or the behavior of similar users. If the confidence module does not observe significant differences between the user's historical and recent behavior, then the confidence module may consider the user's behavior to be "conformant," and assign the user a higher confidence score. In some embodiments, confidence scores CS(r) may range from deviant to borderline to conforming.

Confidence module 530 may also calculate confidence scores associated with a need of users 120 to access resource 130. In one embodiment, confidence module 530 may calculate user need-to-access scores (NA(r)) as a function of the sensitivity scores associated with resource 130 and of confidence scores associated with the requesting user's identity.

A matrix associating sensitivity scores, confidence scores, and need-to-access scores is shown below. For example, a DEVIANT user's request to access a LOW sensitivity document could result in a LOW need-to-access score:

| Sensitivity Score | Confidence Score | Need-To-Access Score |
|---|---|---|
| LOW | DEVIANT | LOW |
| LOW | BORDERLINE | MEDIUM |
| LOW | CONFORMING | HIGH |
| MEDIUM | DEVIANT | LOW |
| MEDIUM | BORDERLINE | MEDIUM |
| MEDIUM | CONFORMING | HIGH |
| MEDIUM | DEVIANT | LOW |
| HIGH | BORDERLINE | MEDIUM |
| HIGH | CONFORMING | HIGH |

Trust module 220 may use users identity confidence (CS) and need-to-access scores (NA) to associate an overall trust score (TS) to requests of users 120 to access resources 130. In one embodiment, trust module 220 may calculate user trust scores based on an average of all confidence and need-to-access scores over all resources 130 accessed by user 120. Trust scores may quantifiably range from lower to higher trust values, establishing the risk associated with each user request to access resources 130.

Trust adjustment module 540 may be configured to adjust the risks associated with a user request to access resource 130 by, for example, adjusting users' need-to-access and confidence scores. In one embodiment, trust adjustment module 540 may use the Generic Authorization and Access-control API (GAA-API) framework to implement real-time adjustments to risks associated with user access requests. Indeed, trust adjustment module 540 may adjust for detected anomalies and abnormal user behavior. For example, trust adjustment module 540 may adjust (e.g., increase or decrease) confidence scores and need-to-access scores associated with a user, based on factors such as suspicious behavior, new policy creation, standard checks, network or system status, and risk association.

In other embodiments, trust adjustment module 540 may adjust user trust scores based on user access profiles 550. User access profiles 550 may include authentication credentials associated with the user. These credentials may be derived from sources such as company directories, trust tokens, historical logs, or third-party identity validation services. In some embodiments, access profile of a user may consist of network or system status (such as time, location), user logs 520, and information from sensors 550. In another embodiment, trust adjustment module 540 may adjust trust scores associated with user requests, based on information from context module 560. Context module 560 may supply additional context information associated with users 120 request to access resources 130. Context information may include, for example, the current state of network 140 (or connected external networks) such as volume of network traffic or unexpected changes in network traffic volume, awareness of the state of external systems with which network 140 must interact, sudden unexpected changes to the number of users and/or user requests accessing network 140 etc.

Figure 6:
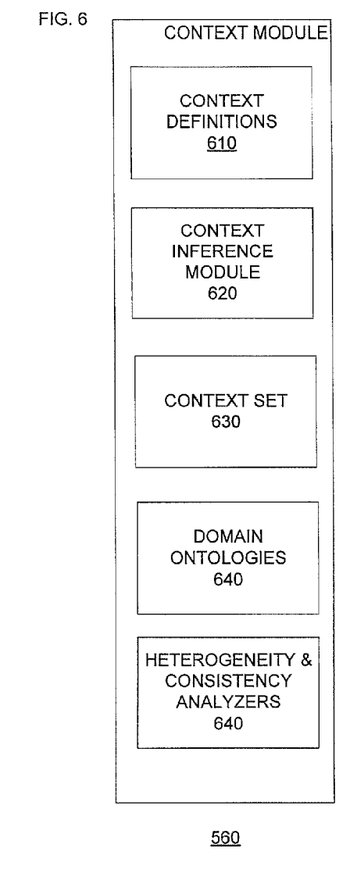
FIG. 6 is a flowchart of functions of an exemplary context module, consistent with certain disclosed embodiments.

FIG. 6 is a block diagram of an exemplary context module, consistent with certain disclosed embodiments. As shown in FIG. 6, context module 560 may include context definitions 610, a context inference module 620, a context set 630, a domain ontology 640, and heterogeneity and consistency analyzers 650. In one embodiment, context module 560 may be configured to determine the context surrounding a user's request to access a resource, for example, whether the user previously accessed similar resources, or whether risk thresholds or other conditions have sufficiently changed (e.g., job promotion, merger, etc.) to justify the user's request.

Context definitions 610 may be configured to include the definitions of common environmental scenarios based on the values of associated context parameters. Examples of context definitions may include determining a base or model operational environment for users 120, resources 130, or network 140. Based on this information, context definitions may be prescribed for a range of conditions and the default treatment of access requests may be tailored to those conditions, including the pace at which the conditions may change.

In one embodiment, context inference module 620 may compute context inferences based on context set 630 and context definitions 610. For example, a context inference could involve determining a risk threshold or tolerance sufficient to maintain current operational conditions between users, resources, and networks. Context inference module 620 may automatically adjust the risk tolerance based on a change from normal to exigent conditions. For example, context inference module 620 may adjust risk tolerance in circumstances where conditions in a hospital change, such as the hospital's emergency room, previously having a light patient load suddenly experiencing a large influx of injured patients due to a mass-casualty incident. Accordingly, context inference module 620 may automatically adjust the hospital's risk tolerance, permitting trust module 220 to grant a greater number of user access requests.

In one embodiment, context set 630 may be configured to contain the context parameters of interest for processing a user's request to access a resource. These parameters may include, for example, current operational conditions, changes to those conditions, previous resource access requests, trends in user access requests (including suspicious or conflicting behaviors), etc.

Domain ontologies 640 may be configured to contain the vocabulary used by different domains to define different types of context. Context definitions, inference mechanisms, and context sets may vary significantly across business domains such as financial services, medical treatment, military operations, communications, and entertainment. A domain ontology is known in information science as a way to represent knowledge as a set of concepts within a domain, and the relationships between pairs of concepts. As such, domain ontologies 640 may represent similar concepts across multiple domains. In one embodiment, domain ontologies 640 may model a domain and support reasoning or deduce logical concepts about entities within the domain.

Context inference module 620 may send context inferences, and resulting context sets, to heterogeneity and consistency analyzers 640. Heterogeneity and consistency analyzers 640 may use domain ontologies 640 to resolve any heterogeneity issues resulting from differing interpretations of context across different domains. For example, when the operational environment in which users access resources over a network encompasses multiple business domains each represented by a specific ontology, heterogeneity and consistency analyzers 640 may accommodate and resolve overlapping or conflicting concept terms and relationships to provide consistent context sets. A military hospital setting may, for example, generate domain ontologies for both medical and military practice that may influence how context inferences are made and what context sets result. Heterogeneity and consistency analyzers 640 may resolve any conflicts and provide combined and consistent context sets.

In one embodiment, heterogeneity and consistency analyzers 640 may use information from context inference module 620 to evaluate the context of user access requests. For example, heterogeneity and consistency analyzer 640 may employ general statistical analysis to compute trends of user 120 (positive or negative) based on comparison of contexts associated with current and prior access requests. Trust adjustment module 540 may use these trends to update system data structures (e.g., trust and sensitivity scores) and modify the risk associated with granting user requests to access resources 130. In some embodiments, trends associated with user requests may be stored in user log 520, may be stored in resource 130, or both. In some embodiments, functions of context module 560 may be computed on another network external to network 140. This may, however, reduce the efficiency of performing real-time analysis of access requests.

Figure 7:
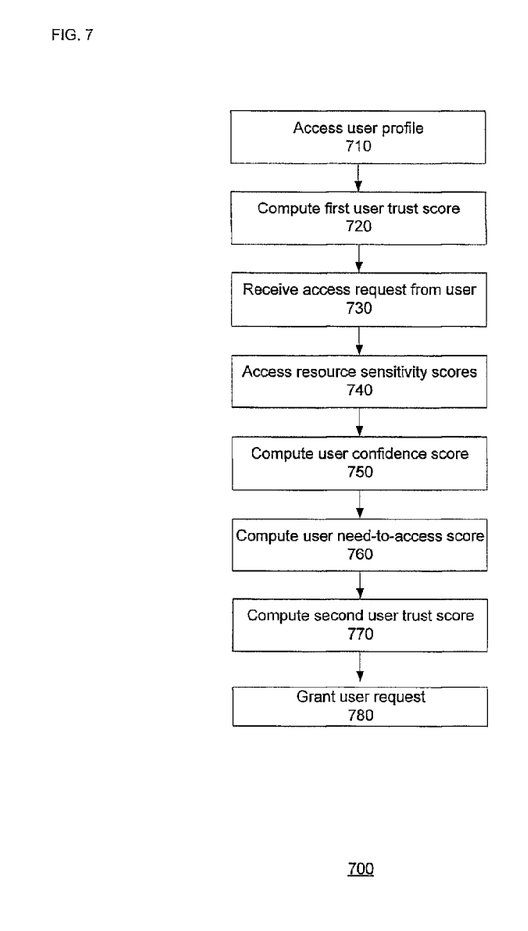
FIG. 7 is a flowchart of an exemplary access control method of an exemplary adaptive risk-based access control system, consistent with certain exemplary embodiments.

Referring now to FIG. 7, an exemplary method 700 for management of resources. Specifically, method 700 processes a request from a user, such as an employee, to access a resource such as a company financial record. In this example, access control engine 150 may access user profiles, including the employee's profile (710). The employee's profile may consist of the employee's, title, role, address, salary etc. Next, the method computes first user trust scores, including the employee's first trust score (720). Consistent with the embodiments disclosed herein, when access control engine 150 receives the employee's request to access the record (730), access control engine 150, may then access a sensitivity score for the record (740). Access control engine 150 may then compute a confidence score for the employee (750) and a need-to-access score for the employee (760). The method may then use the sensitivity score and the employee's computed confidence and need-to-access scores to compute or generate a second trust score for the employee (770). Accordingly, access control engine may selectively grant the employee's request for access to the record based on the second trust score (780). Further, access control engine 150 may continue to monitor and assess the requesting employee's actions on the system, the contents of the document, and the context of all requests associated with that employee, and may increase or decrease the employee's trust score based on that assessment. Consequently, if the employee attempts to access that same financial record, access control engine 150 may deny that second request, based on the lower trust score associated with the employee, the context of the request, or the risk threshold of the company. As a result, the company is able to adaptively control access to its resources based on dynamic risk calculations.

While certain features and embodiments of the disclosure have been described, other embodiments of the disclosure will be apparent to those skilled in the art from consideration of the specification and practice of the embodiments of the disclosure disclosed herein. Furthermore, although aspects of embodiments of the present disclosure have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the disclosure.

It is intended, therefore, that the specification and examples be considered as exemplary only, with a true scope and spirit of the disclosure being indicated by the following claims and their full scope of equivalents.

What is claimed is:

1. A method comprising:
    storing, by a device, a plurality of documents;
    identifying, by the device, profile information associated with a plurality of users;
    identifying, by the device and based on receiving request information from a user device associated with a user of the plurality of users, and via a network, a sensitivity score for a document of the plurality of documents,
        the sensitivity score for the document being determined based on frequencies of one or more words within the document, and
        the request information including information requesting transmittal of the document to the user;
    computing, by the device and based on receiving the request information, a confidence score for the user,
        the confidence score being computed based on the profile information and based on a comparison of historical actions of the user and actions, of the user, occurring during a particular period of time;
    computing, by the device and based on receiving the request information, a need-to-access score for the user,
        the need-to-access score being computed based on the sensitivity score for the document and the confidence score for the user;
    computing, by the device, a user trust score for the user,
        the user trust score being computed by using the sensitivity score, the confidence score,
    and the need-to-access score;
    adjusting, by the device and based on the profile information associated with the user, the user trust score to generate an adjusted user trust score; and
    selectively transmitting, by the device, based on the adjusted user trust score, and to the user device via the network, the document.

2. The method of claim 1, where identifying the sensitivity score comprises:
    classifying the document;
    assigning, based on classifying the document, the sensitivity score to the document; and
    identifying the sensitivity score based on assigning the sensitivity score to the document.

3. The method of claim 1, where computing the user trust score comprises:
using a respective profile, of the profile information, to compute the user trust score.

4. The method of claim 1, where:
the user is granted access to the document when the adjusted user trust score satisfies a threshold value, and
the user is not granted access to the document when the adjusted user trust score does not satisfy the threshold value.

5. The method of claim 4, further comprising:
adjusting, when the user is granted access to the document, the adjusted user trust score based on user action associated with the document.

6. The method of claim 1, where computing the confidence score comprises:
analyzing the historical actions of the user,
the historical actions including information associated with one or more previous access requests, by the user, for the document; and
computing the confidence score based on analyzing the historical actions of the user.

7. The method of claim 1, where the sensitivity score is based on content included in the document.

8. A device comprising:
a memory to store instructions; and
a processor to execute the instructions to:
store a plurality of documents;
identify profile information associated with a plurality of users;
identify, based on receiving request information from a user device associated with a user of the plurality of users, and via a network, a sensitivity score for a document of the plurality of documents,
the sensitivity score for the document being determined based on frequencies of one or more words within the document, and
the request information including information requesting transmittal of the document to the user;
compute, based on receiving the request information, a confidence score for the user,
the confidence score being computed based on a comparison of historical actions of the user and actions, of the user, occurring during a particular period of time;
compute, based on receiving the request information, a need-to-access score for the user,
the need-to-access score being computed based on the sensitivity score for the document and the confidence score for the user;
compute a user trust score for the user,
the user trust score being computed by using the sensitivity score, the confidence score, and the need-to-access score;
adjust, based on the profile information, the user trust score to generate an adjusted user trust score; and
selectively transmit, based on the adjusted user trust score, and to the user device via the network, the document.

9. The device of claim 8, where the processor, when identifying the sensitivity score, is to:
classify the document;
assign, based on classifying the document, the sensitivity score to the document; and
identify the sensitivity score based on assigning the sensitivity score to the document.

10. The device of claim 8, where the processor, when computing the user trust score, is to:
use a respective profile, of the profile information, to compute the user trust score.

11. The device of claim 8, where:
the user is granted access to the document when the adjusted user trust score satisfies a threshold value, and
the user is not granted access to the document when the adjusted user trust score does not satisfy the threshold value.

12. The device of claim 11, where the processor is further to:
adjust, when the user is granted access to the document, the adjusted user trust score based on user action associated with the document.

13. The device of claim 8, where the processor, when computing the confidence score, is to:
analyze the historical actions of the user,
the historical actions including information associated with one or more previous access requests, by the user, for the document; and
compute the confidence score based on analyzing the historical actions of the user.

14. The device of claim 8, where the sensitivity score is based on content included in the document.

15. A non-transitory computer-readable medium storing instructions, the instructions comprising:
one or more instructions which, when executed by a processor, cause the processor to:
store a plurality of documents;
identify profile information associated with a plurality of users;
identify, based on receiving request information from a user device associated with a user of the plurality of users, and via a network, a sensitivity score for a document of the plurality of documents,
the sensitivity score for the document being determined based on frequencies of one or more words within the document, and
the request information including information requesting transmittal of the document to the user;
compute, based on receiving the request information, a confidence score for the user,
the confidence score being computed based on a comparison of historical actions of the user and actions, of the user, occurring during a particular period of time;
compute, based on receiving the request information, a need-to-access score for the user
the need-to-access score being computed based on the sensitivity score for the document and the confidence score for the user;
compute a user trust score for the user,
the user trust score being computed by using the sensitivity score, the confidence score, and the need-to-access score;
adjust, based on the profile information, the user trust score to generate an adjusted user trust score; and
selectively transmit, based on the adjusted user trust score, and to the user device via the network, the document.

16. The non-transitory computer-readable medium of claim 15, where the one or more instructions to identify the sensitivity score include:
one or more instructions to classify the document;
one or more instructions to assign, based on classifying the document, the sensitivity score to the document; and
one or more instructions to identify the sensitivity score based on assigning the sensitivity score to the document.

17. The non-transitory computer-readable medium of claim 15, where the one or more instructions to compute the user trust score include:
one or more instructions to use a respective profile, of the profile information, to compute the user trust score.

18. The non-transitory computer-readable medium of claim 15, where:
the user is granted access to the document when the adjusted user trust score satisfies a threshold value, and
the user is not granted access to the document when the adjusted user trust score does not satisfy the threshold value.

19. The non-transitory computer-readable medium of claim 18, where the instructions further include:
one or more instructions to adjust, when the user is granted access to the document, the adjusted user trust score based on user action associated with the document.

20. The non-transitory computer-readable medium of claim 15, where the one or more instructions to compute the confidence score include:
one or more instructions to analyze the historical actions of the user,
the historical actions including information associated with one or more previous access requests, by the user, for the document; and
one or more instructions to compute the confidence score based on analyzing the historical actions of the user.

* * * * *